(12) United States Patent
Schick et al.

(10) Patent No.: US 9,126,279 B2
(45) Date of Patent: Sep. 8, 2015

(54) BRAZING METHOD

(71) Applicant: GENERAL ELECTRIC COMPANY, Schenectady, NY (US)

(72) Inventors: David Edward Schick, Greenville, SC (US); Srikanth Chandrudu Kottilingam, Simpsonville, SC (US); Benjamin Paul Lacy, Greer, SC (US); John Wesley Harris, Jr., Taylors, SC (US); Brian Lee Tollison, Honea Path, SC (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 14/041,701

(22) Filed: Sep. 30, 2013

(65) Prior Publication Data
US 2015/0090773 A1   Apr. 2, 2015

(51) Int. Cl.
B23K 31/02 (2006.01)
B23K 1/00 (2006.01)
B23K 1/20 (2006.01)
B23K 1/19 (2006.01)

(52) U.S. Cl.
CPC .......... *B23K 1/0018* (2013.01); *B23K 1/00* (2013.01); *B23K 1/19* (2013.01); *B23K 1/20* (2013.01); *B23K 2201/001* (2013.01)

(58) Field of Classification Search
None
See application file for complete search history.

(56) References Cited

U.S. PATENT DOCUMENTS

| 2,392,886 | A | * | 1/1946 | Stecher et al. | 29/890.035 |
| 2,648,520 | A | * | 8/1953 | Schmitt | 416/92 |
| 3,657,789 | A | * | 4/1972 | Anglade | 29/56.6 |
| 4,040,159 | A | * | 8/1977 | Darrow et al. | 29/889.721 |
| 4,342,893 | A | * | 8/1982 | Wolf | 200/268 |
| 4,843,693 | A | * | 7/1989 | Chisholm | 29/890.054 |
| 5,848,083 | A | | 12/1998 | Haden et al. | |
| 5,947,365 | A | * | 9/1999 | Tanaka et al. | 228/136 |
| 6,103,186 | A | * | 8/2000 | Sievers et al. | 419/8 |
| 6,367,686 | B1 | * | 4/2002 | Abriles et al. | 228/206 |
| 6,530,971 | B1 | * | 3/2003 | Cohen et al. | 75/254 |

(Continued)

FOREIGN PATENT DOCUMENTS

| EP | 2353763 A1 | * | 8/2011 |
| JP | 2010194578 A | | 9/2010 |
| JP | 2010274311 A | | 12/2010 |

OTHER PUBLICATIONS

European Search Report and Written Opinion issued in connection with corresponding EP Application No. 14185440.6-1702 dated Mar. 5, 2015.

*Primary Examiner* — Kiley Stoner
(74) *Attorney, Agent, or Firm* — McNees Wallace & Nurick LLC

(57) ABSTRACT

A brazing method is disclosed. The brazing method includes providing a substrate, providing at least one groove in the substrate, providing a support member, positioning the support member over the at least one groove in the substrate, providing a braze material, applying the braze material over the support member to form an assembly, and heating the assembly to braze the braze material to the substrate. Another brazing method includes providing a preform, providing a wire mesh, pressing the wire mesh into the preform, heating the preform to form a braze material including the wire mesh, providing a substrate, providing at least one groove in the substrate, applying the braze material over the at least one groove in the substrate, then brazing the braze material to the substrate.

12 Claims, 9 Drawing Sheets

(56) References Cited

U.S. PATENT DOCUMENTS

| | | | |
|---|---|---|---|
| 6,604,669 B1* | 8/2003 | Syslak et al. | 228/166 |
| 7,036,712 B2* | 5/2006 | Joy et al. | 228/248.1 |
| 7,695,247 B1 | 4/2010 | Liang | |
| 7,740,442 B2 | 6/2010 | Lee et al. | |
| 7,857,589 B1 | 12/2010 | Liang | |
| 8,235,275 B1* | 8/2012 | Stankowski et al. | 228/56.3 |
| 2003/0218054 A1* | 11/2003 | Koenigsmann et al. | 228/115 |
| 2005/0074334 A1* | 4/2005 | Schultz | 416/180 |
| 2007/0158398 A1* | 7/2007 | Budinger et al. | 228/246 |
| 2011/0180199 A1* | 7/2011 | Huxol et al. | 156/94 |
| 2012/0111928 A1* | 5/2012 | Park et al. | 228/245 |
| 2013/0095342 A1 | 4/2013 | Schick et al. | |
| 2013/0156555 A1* | 6/2013 | Budinger et al. | 415/182.1 |
| 2013/0180694 A1* | 7/2013 | Englert et al. | 165/168 |
| 2014/0170433 A1* | 6/2014 | Schick et al. | 428/548 |
| 2014/0220376 A1* | 8/2014 | Schick et al. | 428/615 |

* cited by examiner

BRAZING METHOD

FIELD OF THE INVENTION

The present invention is directed to a brazing method. More specifically, the present invention is directed to brazing methods for forming cooling microchannels.

BACKGROUND OF THE INVENTION

Turbine systems are continuously being modified to increase efficiency and decrease cost. One method for increasing the efficiency of a turbine system includes increasing the operating temperature of the turbine system. To increase the temperature, the turbine system must be constructed of materials which can withstand such temperatures during continued use.

In addition to modifying component materials and coatings, the temperature capability of a turbine component may be increased through the use of cooling microchannels. The cooling microchannels can be incorporated into metals and alloys used in high temperature regions of gas turbines. However, forming an exterior cover over the cooling microchannels can be difficult as thermal spraying directly over the channel can result in coating material filling the channel. One method to prevent the coating material from filling the channel includes filling the channel with a sacrificial material prior to coating, then coating the component and subsequently leeching out the sacrificial material. The filling and removing of the sacrificial material can be both difficult and expensive.

As an alternative to filling and leeching, a thin cover layer can be brazed to the substrate, over the cooling microchannel. However, during the brazing of materials to a surface of the substrate, the brazing temperatures required to sufficiently braze the material may also soften the braze cover material. The softened material can sag or droop into the cooling microchannels, blocking them as they harden. As such, brazing requires a very narrow temperature range, outside of which the component can be damaged or made unusable.

A brazing method that does not suffer from one or more of the above drawbacks would be desirable in the art.

BRIEF DESCRIPTION OF THE INVENTION

In one embodiment, a brazing method includes providing a substrate having at least one groove. Next, a support member is provided and positioned over the at least one groove in the substrate. A braze material is provided and applied over the support member, the support member and the braze material forming a first braze assembly. Next, the first braze assembly is heated to braze the first braze assembly to the substrate.

In another exemplary embodiment, a brazing method includes providing a preform, providing a mesh, pressing the mesh into the preform, heating the preform to form a second braze assembly, providing a substrate, providing at least one groove in the substrate, applying the second braze assembly over the at least one groove in the substrate, then brazing the second braze assembly to the substrate.

In another exemplary embodiment, a brazing method includes providing a braze material, forming at least one groove in the braze material, securing support members within the at least one groove to form a third braze assembly, providing a substrate, applying the third braze assembly over the substrate, and brazing the third braze assembly to the substrate to form a brazed article. The at least one groove in the third braze assembly forms at least one cooling microchannel in the brazed article.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary brazing method. Embodiments of the present disclosure, in comparison to processes and articles not using one or more of the features disclosed herein, increase efficiency of cooling microchannel formation, decrease cost of cooling microchannel formation, decrease encroachment of braze material into cooling microchannels during brazing, permit increased brazing temperatures, decrease scrap rate during brazing, permit formation of cooling microchannels in the braze material, or a combination thereof.

Figure 1:
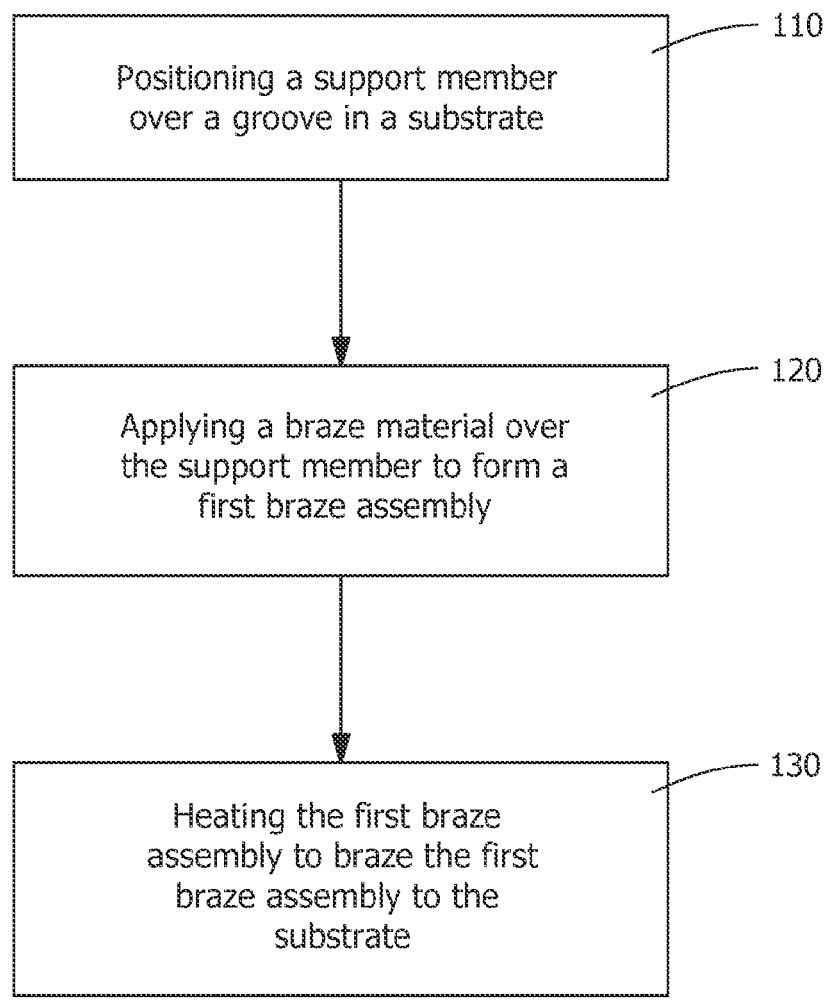
FIG. 1 is a flow chart of a brazing method according to an embodiment of the disclosure.
Figure 2:
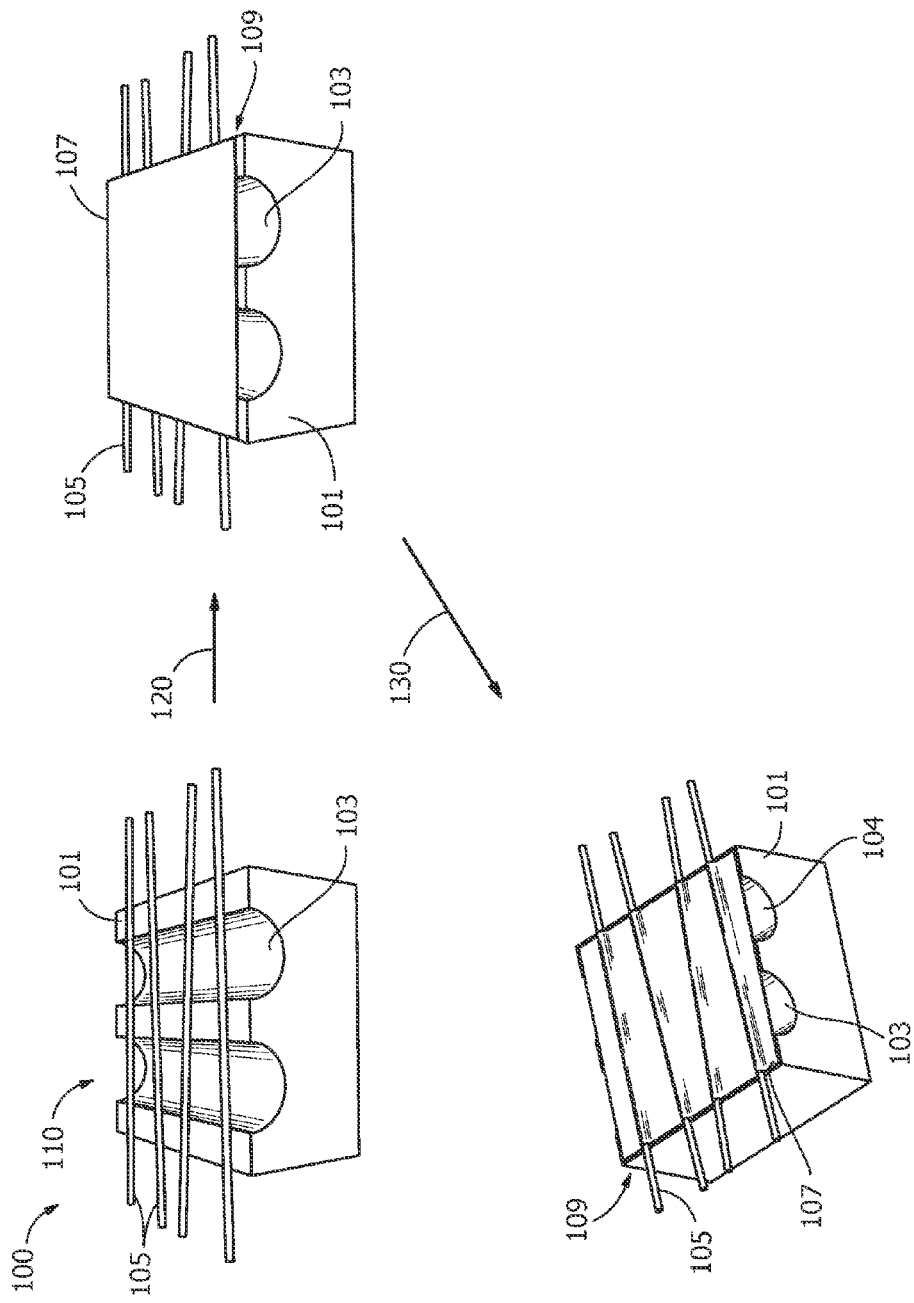
FIG. 2 is a process view of a brazing method according to an embodiment of the disclosure.

Referring to FIG. 1 and FIG. 2, in one embodiment, a brazing method 100 includes providing a substrate 101 having at least one groove 103, providing a support member 105, positioning the support member 105 over the groove 103 in the substrate 101 (step 110), providing a braze material 107, applying the braze material 107 over the support member 105 (step 120) to form a first braze assembly 109 comprising the support member 105 and the braze material 107, and heating the first braze assembly 109 (step 130) to braze the first braze assembly 109 to the substrate 101. In another embodiment, the braze material 107 may be formed with a thickness of up to 30 mils, up to 25 mils, up to 20 mils, or a combination thereof. The brazing is performed by any suitable braze method capable of securing the braze material 107 of the first braze assembly 109 to the substrate 101 to form a brazed article. Each of the at least one grooves 103 in substrate 101 forms a cooling microchannel 104 in the brazed article. Suitable braze methods include, but are not limited to, vacuum brazing, atmospheric brazing, brazing in a non-oxidizing atmosphere, or a combination thereof. The braze material 107 includes any suitable material such as, but not limited to, a nickel-based braze alloy.

Figure 3:
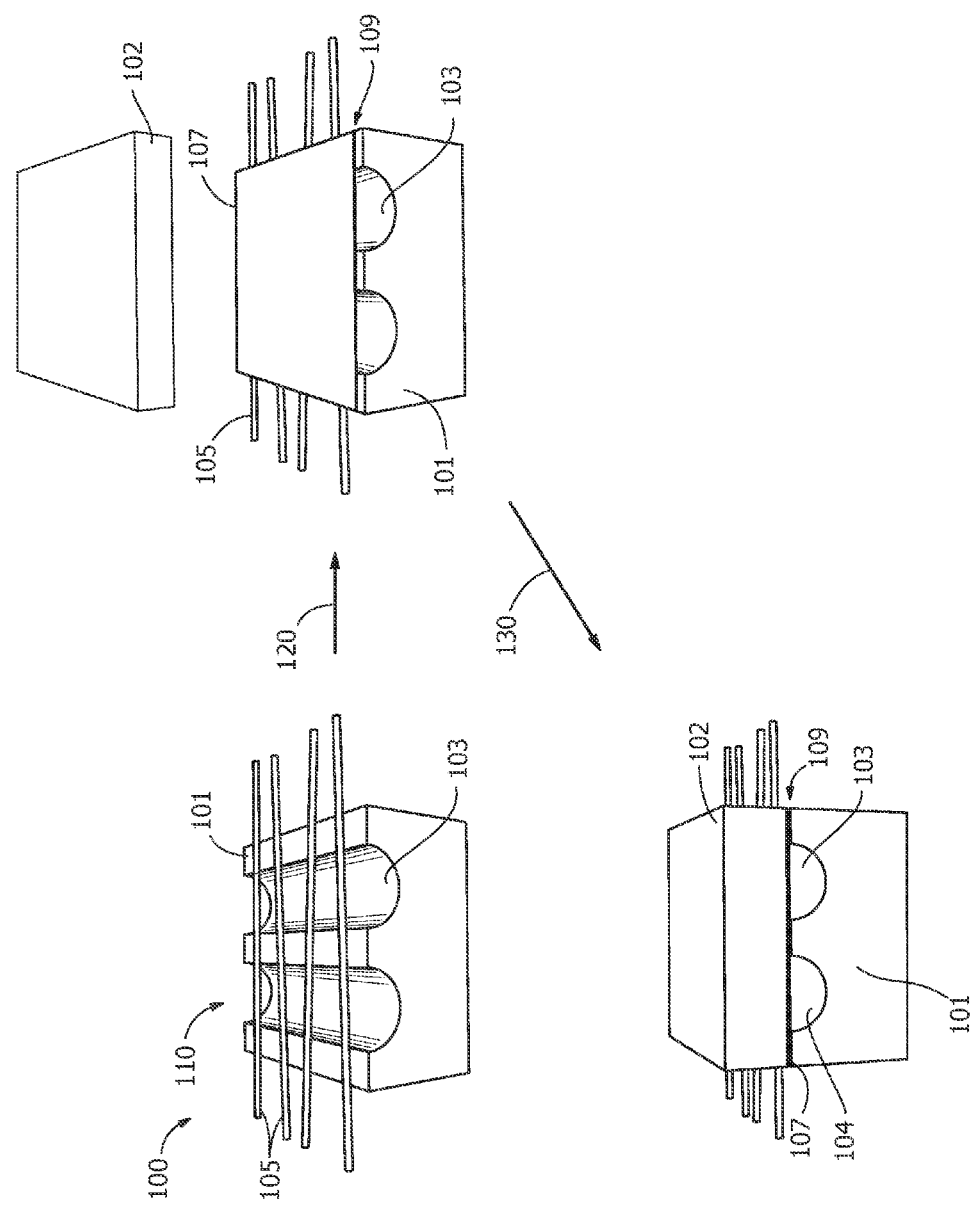
FIG. 3 is a process view of a brazing method according to an embodiment of the disclosure.
Figure 9:
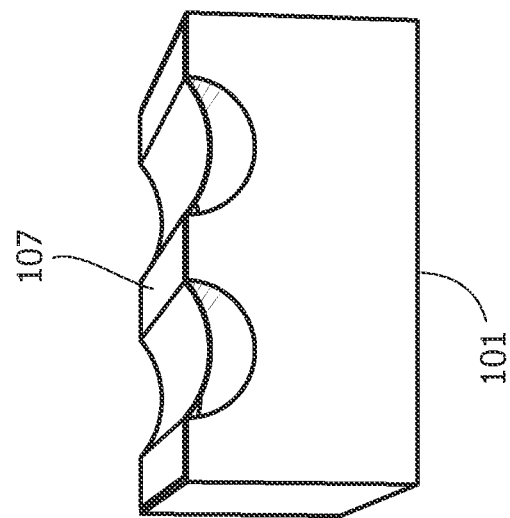
FIG. 9 is a process view of a prior art brazing method showing a braze material forming a convex border within a groove in a substrate.
Figure 9:
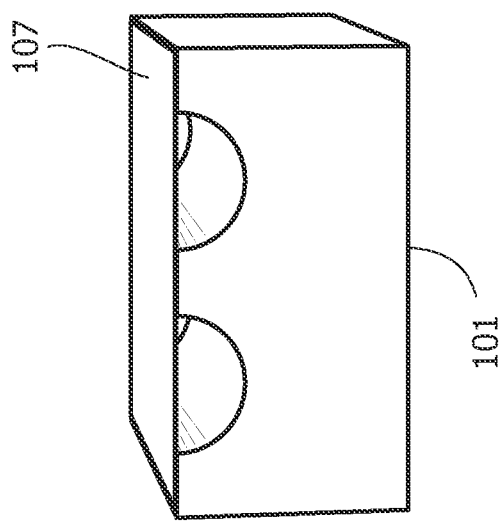

Referring to FIG. 3, in one embodiment, the first braze assembly 109 also may be intermediate the substrate 101 having the groove 103, and a second substrate 102 comprising the same material. In this embodiment, not only does the first braze assembly 109 prevent sagging, slumping, or drooping of the braze material 107 into the groove 103, but the first braze assembly 109 joins the substrate 101 having the groove 103 to the second substrate 102. Referring to FIG. 9, sagging, slumping, or drooping, as used herein, refers to the braze material 107 entering the groove 103 and forming a convex border within the groove 103.

During the heating of the first braze assembly 109 (step 130), a braze temperature softens the braze material 107, which otherwise may sag, slump, or droop into the groove 103 under its own weight without support. However, positioning of the support member 105 over the groove 103 (step 110) maintains the braze material 107 above the groove 103, minimizing, reducing, or eliminating the sagging, slumping, or drooping of the braze material 107. Additionally, the support member 105 reduces or eliminates scrap formation from an application utilizing increased heat to the braze material 107 by reducing or eliminating the sagging or drooping of the braze material 107 into the groove 103. The support member 105 may be any suitable article capable of maintaining the braze material 107 above the groove 103 during the heating of the first braze assembly 109 (step 130). Suitable articles for the support member 105 include, but are not limited to, a rod, a wire, a mesh 201 (FIG. 2), a solid sheet, a perforated sheet, or a combination thereof. The support member 105 preferably should have a sufficiently high melting temperature to survive brazing. However, support member 105 may be incorporated into the brazed article or may degrade within the brazed article during the life of the turbine.

The positioning of the support member 105 over the groove 103 (step 110) to reduce or eliminate the slumping, sagging, or drooping of the softened braze material 107 permits brazing temperatures to be achieved without the braze material 107 entering the groove 103. In one embodiment, the support member 105 may be assimilated into the braze material 107 by the increased brazing temperatures during the heating of the first braze assembly 109 (step 130). In one embodiment, the support member 105 has a higher melting and softening temperature than temperature of the braze material 107 and is incorporated into a brazed article. The support member 105 that can withstand the heating of the first braze assembly 109 (step 130) includes any suitable composition that is not softened at brazing temperatures. Suitable compositions include those that are similar or substantially similar to the substrate 101, such as, but not limited to, ceramics, metal alloys, or a combination thereof. Support members that may degrade include materials that may oxidize during high temperature turbine operations, such as steel.

The cooling microchannel 104 forms between the substrate 101 and the first braze assembly 109. The cooling microchannel 104 includes an open interior space to permit the flow of a fluid therein. Reducing or eliminating the sagging or drooping of the softened braze material 107 into the open interior space of the cooling microchannel 104 permits unimpeded flow of cooling fluid. In one embodiment, the cooling microchannel 104 includes a width and/or depth of, but not limited to, between about 5 mils and about 200 mils, between about 10 mils and about 150 mils, between about 10 mils and about 100 mils, or any combination, sub-combination, range, or sub-range thereof wherein one mil equals 0.001 inches. In another embodiment, the width and/or depth of the cooling microchannel 104 varies between channels or along the cooling microchannel 104 itself. In a further embodiment, the cooling microchannel 104 includes any suitable cross-sectional shape such as, but not limited to, a circle, a semi-circle, a square, a rectangle, an oval, a triangle, any other polygonal shape, or a combination thereof.

The substrate 101 includes any component utilizing the cooling microchannel 104 therein such as, but not limited to, a bucket, a nozzle, a shroud, a hot gas path component, or combustor. In one embodiment, the first braze assembly 109 is shaped prior to heating (step 130) to conform with the shape of the substrate 101 so that the fluid flowing through the cooling microchannel 104 does not leak. The substrate includes any suitable brazeable composition such as, but not limited to, a nickel-based alloy, a cobalt-based alloy, a high-strength steel alloy, or a combination thereof. In a gas turbine, the substrate 101 having the cooling microchannel 104 is exposed to operational temperatures of between about 1600° F. and about 2400° F., between about 1700° F. and about 2300° F., between about 1800° F. and about 2200° F., or any combination, sub-combination, range, or sub-range thereof. Providing the braze material 107 having a similar or substantially similar coefficient of thermal expansion to the substrate may reduce stress from differential expansion during operation.

Figure 4:
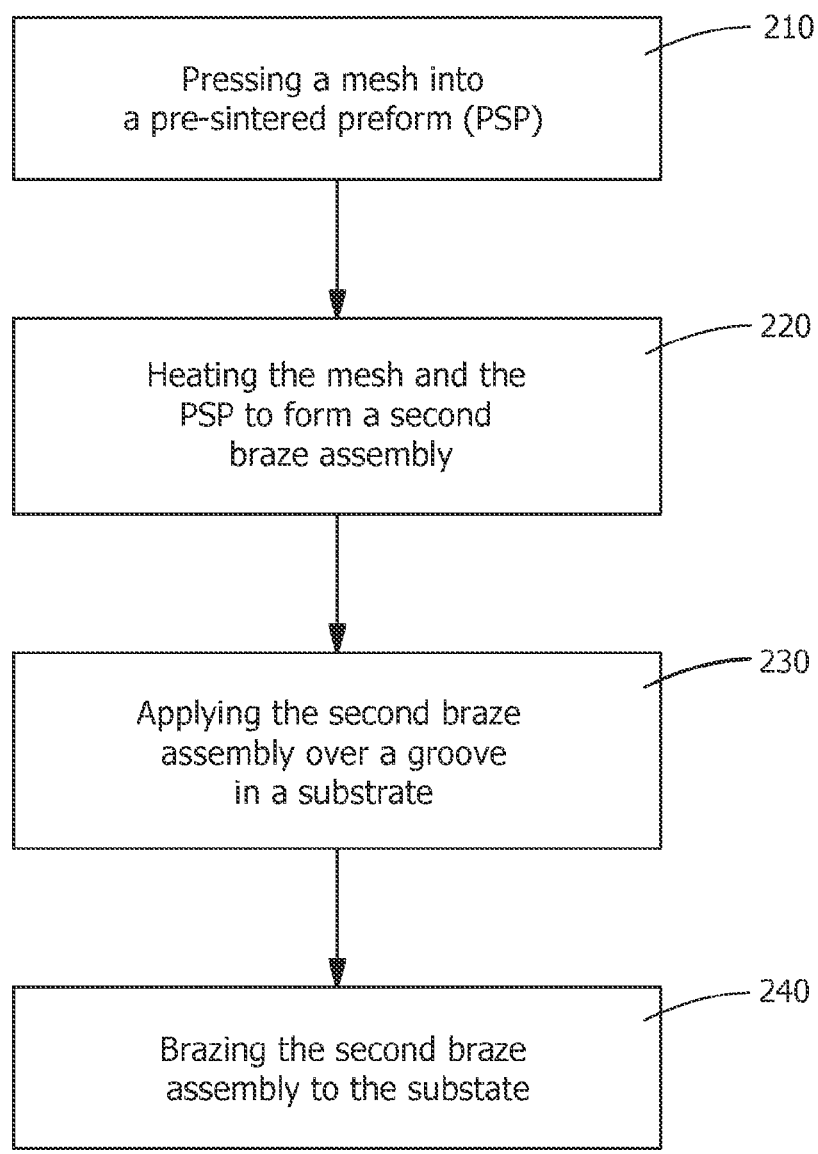
FIG. 4 is a flow chart of a brazing method according to an embodiment of the disclosure.
Figure 5:
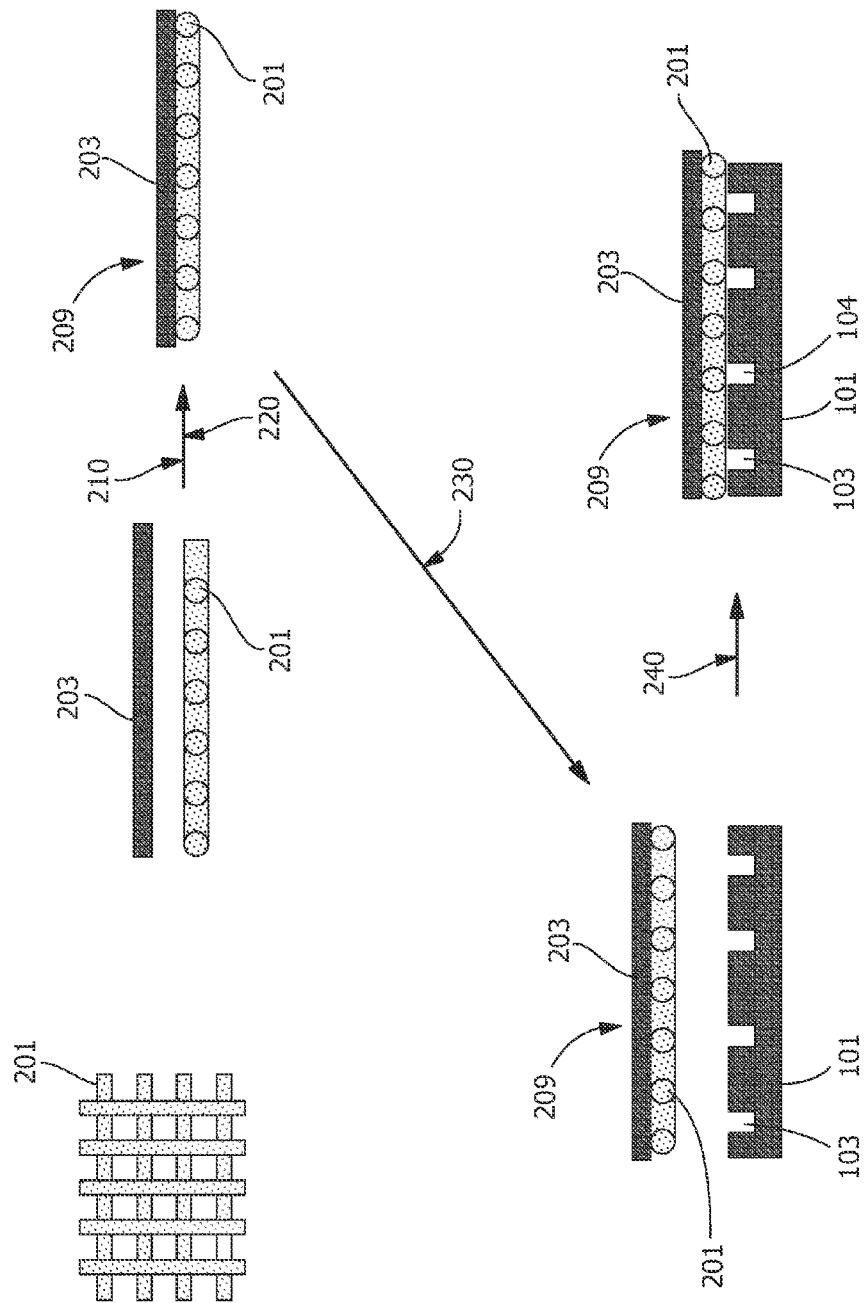
FIG. 5 is a process view of a brazing method according to an embodiment of the disclosure.

Referring to FIG. 4 and FIG. 5, in one embodiment, the mesh 201 is pressed (step 210) into a preform 203 in a "green" state prior a sintering operation, then heated (step 220) to form a second braze assembly 209. In another embodiment, the mesh 201 is pressed (step 210) in between two (2) or more layers of the preform 203 then heated (step 220) to form the second braze assembly 209.

In one embodiment, prior to heating (step 220), the preform 203 in the "green" state forms a felt-type material. The preform 203 includes at least a high-melting alloy, a low-melting alloy, and a binder. In another embodiment, both the high-melting alloy and the low-melting alloy are in powdered form held together by the binder. Heating (step 220) of the preform 203 sinters the preform 203, volatilizing or burning the binder and securing the high-melting alloy, the low-melting alloy, and the mesh 201 to each other. The heating (step 220) is performed at any suitable temperature below the brazing temperature of the preform 203, but sufficiently high to coalesce the high-melt alloy powder and the low-melt alloy powder with minimal melting of the low-melt alloy. Additionally, in another embodiment, the heating (step 220) of the preform 203 provides incipient melting of the low-melt alloy which provides for binding of the high melt alloy and mesh 201. Suitable temperatures include, but are not limited to, between about 1700° F. and about 2200° F., between about 1800° F. and about 2000° F., between about 1850° F. and about 1950° F., or any combination, sub-combination, range, or sub-range thereof. The high-melting alloy may be similar or substantially similar to the substrate 101. The low-melting alloy includes materials which melt below the high-melting material or the substrate, for example around 2000° F.

In one embodiment, the low-melting alloy has a composition characterized by a nominal weight percentage of between about 8.0% and about 8.7% Cr, between about 9% and about 10% Co, between about 5.25% and about 5.75% Al, up to about 0.9% Ti (for example, between about 0.6% and about 0.9%), between about 9.3% and about 9.7% W, up to about 0.6% Mo (for example, between about 0.4% and about 0.6%), between about 2.8% and about 3.3% Ta, between about 1.3% and about 1.7% Hf, up to about 0.1% C (for example, between about 0.07% and about 0.1%), up to about 0.02% Zr (for example, between about 0.005% and about 0.02%), up to about 0.02% B (for example, between about 0.01% and about 0.02%), up to about 0.2% Fe, up to about 0.12% Si, up to about 0.1% Mn, up to about 0.1% Cu, up to about 0.01% P, up to about 0.004% S, up to about 0.1% Nb, and a balance of nickel. In another embodiment, the low-melting alloy has a composition characterized by a nominal weight percentage of about 19.0 percent chromium, about 0.03 percent boron, about 10 percent silicon, about 0.1 percent carbon, and balance nickel.

In one embodiment, the high-melting alloy has a composition characterized by a nominal weight percentage of about 12 percent cobalt, about 6.8 percent chromium, about 4.9 percent tungsten, about 1.5 percent molybdenum, about 6.1 percent aluminum, about 6.3 percent tantalum, about 0.12 percent carbon, about 2.8 percent rhenium, about 1.2 percent hafnium, and balance nickel.

The second braze assembly 209 is applied over the groove 103 in the substrate 101 (step 230) and brazed (step 240) to the substrate 101. The mesh 201 increases the rigidity of the second braze assembly 209, reducing or eliminating slumping, sagging, and/or drooping into the groove 103 during the brazing (step 240). The brazing (step 240) of the second braze assembly 209 over the groove 103 forms a cover over the cooling microchannel 104 in the substrate 101. The mesh 201 remains within the second braze assembly 209 forming a portion of the brazed article, or is assimilated during the brazing or during subsequent operation of the turbine (step 240). In one embodiment, the second braze assembly 209 is shaped prior to brazing (step 240) to conform with the shape of the substrate 101 so that the fluid flowing through the cooling microchannel 104 does not leak.

Figure 6:
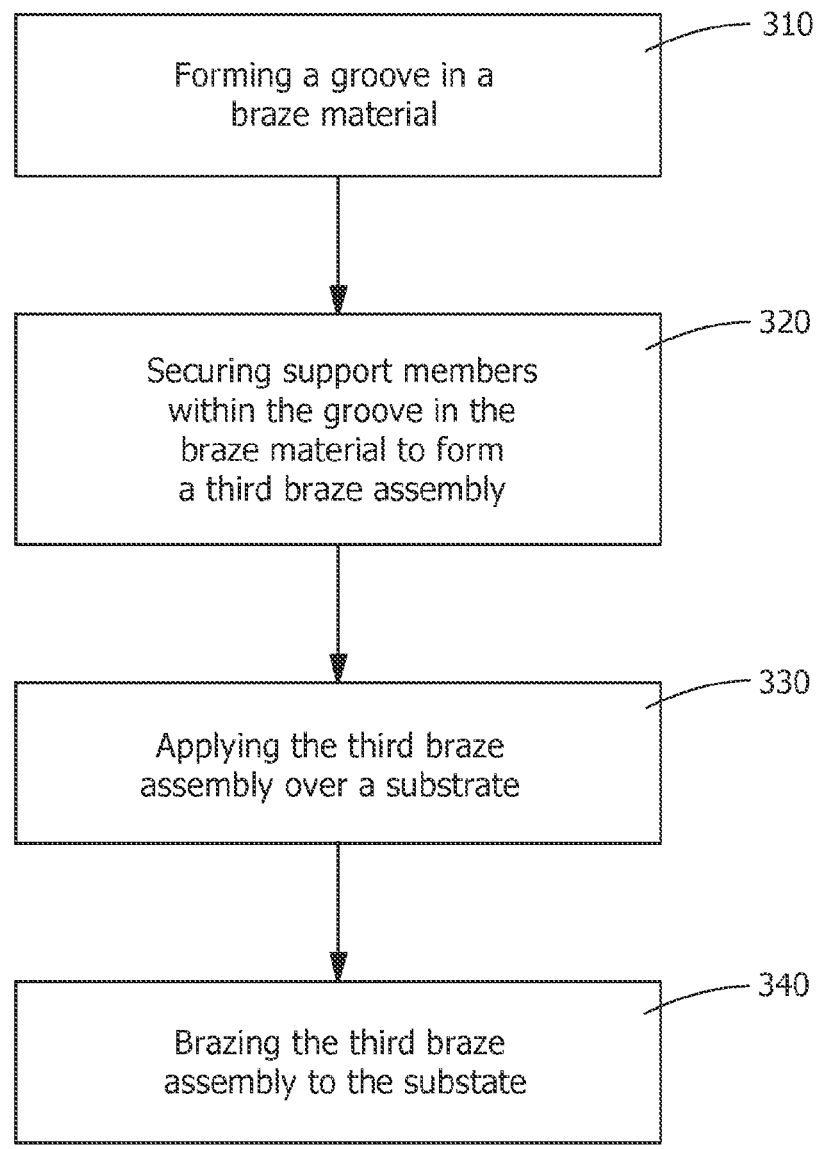
FIG. 6 is a flow chart of a brazing method according to an embodiment of the disclosure.
Figure 7:
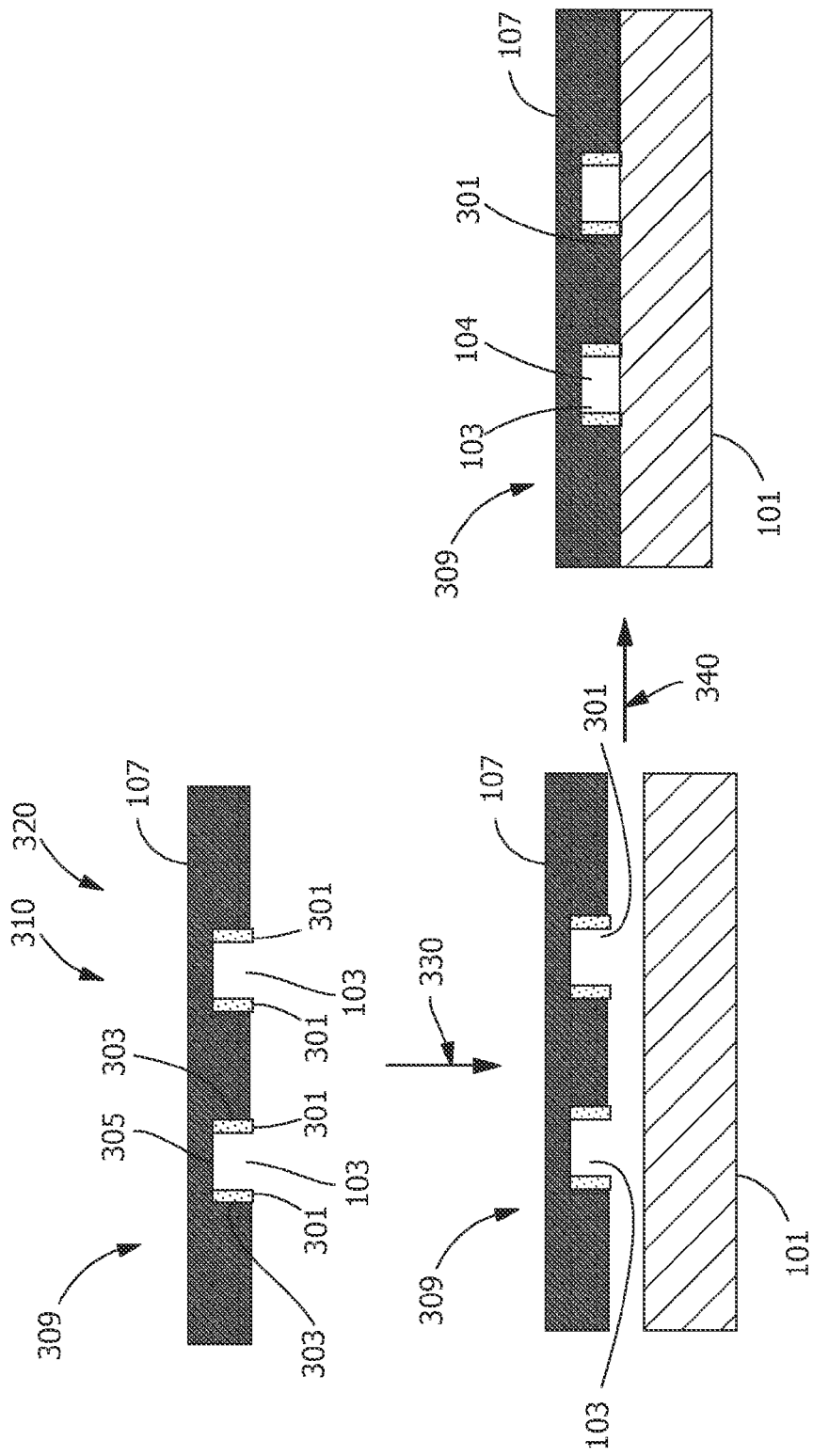
FIG. 7 is a process view of a brazing method according to an embodiment of the disclosure.

Referring to FIG. 6 and FIG. 7, in one embodiment, at least one of the grooves 103 is formed (step 310) in the braze material 107 and support members 301 are secured (step 320) within the groove 103 in the braze material 107 to form a third braze assembly 309. In one embodiment, the support members 301 include the same material as the substrate 101, and have a melting temperature above the brazing temperature of the braze material 107. The support members 301 are secured (step 320) in any suitable position within the groove 103 to reduce or eliminate slumping, sagging, and/or drooping of the braze material 107 into the groove 103. Suitable positions include, but are not limited to, side portions 303 of the groove 103, a top portion 305 of the groove 103, or a combination thereof.

After securing (step 320) the support members 301 within the groove 103, the third braze assembly 309 is applied (step 330) over the substrate 101. The third braze assembly 309 is shaped prior to applying (step 330) to conform with the shape of the substrate 101 so that the fluid flowing through the cooling microchannel 104 does not leak. In one embodiment, when the third braze assembly 309 is applied (step 330), at least one of the grooves 103 in the third braze assembly 309 is positioned to correspond with at least one of the grooves 103 in the substrate 101. Together, the corresponding grooves 103 between the third braze assembly 309 and the substrate 101 form the cooling microchannels 104. In another embodiment, when the third braze assembly 309 is applied (step 330), at least one of the grooves 103 in the third braze assembly 309 is positioned such that it does not correspond with the at least one groove 103 in the substrate 101. Each non-corresponding groove 103 in either the substrate 101 or the third braze assembly 309 forms a separate microchannel 104. In an alternate embodiment, the substrate 101 does not include the grooves 103. Applying (step 330) the third braze assembly 309 over the substrate 101 without the grooves 103 permits the formation of the cooling microchannels 104 without forming the grooves 103 in the substrate 101.

Figure 8:
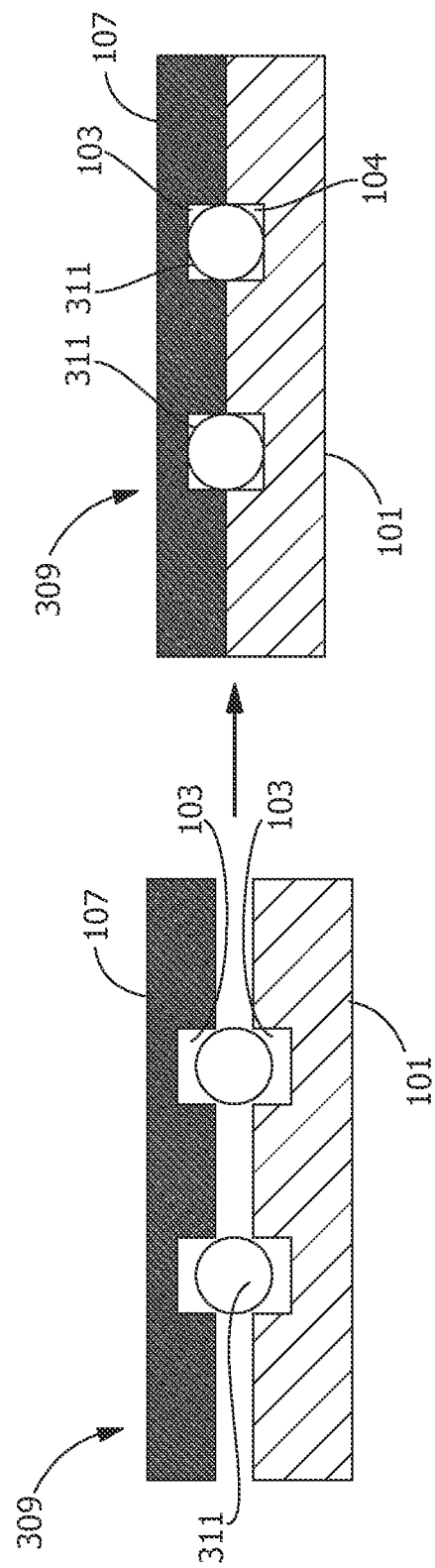
FIG. 8 is a process view of a brazing method according to an embodiment of the disclosure.

Referring to FIG. 8, in an alternate embodiment, the support members 301 include a single metal form positioned and/or secured within the groove 103 in the braze material 107 to form the third braze assembly 309. For example, in one embodiment, the support member 301 is a microtube 311 positioned within the groove 103. The microtube 311 has a higher melting temperature than the braze material 107, and is secured (step 320) within the groove 103 during the brazing (step 340) of the third braze assembly 309 to the substrate 101. The microtube 311 secured within the groove 103 forms the microchannel 104 in the brazed article. The microtube 311 includes any suitable shape such as, but not limited to, circular, square, rectangular, triangular, any other polygonal shape, or a combination thereof. In another embodiment, the shape and/or size of the microtube 311 is varied along the length of the microtube 311.

The support members 301 include any suitable material for maintaining the shape of the groove 103 during the brazing (step 340). Suitable materials include, but are not limited to, ceramics, metal alloys, or a combination thereof. For example, in one embodiment, the support members 301 include ceramic, and are not brazed (step 340) to the substrate 101 during the elevated temperature brazing (step 340). In another example, the support members 301 include metal alloys and both the braze material 107 of the third braze assembly 309 and the support members 301 are brazed (step 340) to the substrate 101 during the elevated temperature brazing (step 340).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A brazing method, comprising:
   providing a substrate having at least one groove;
   providing a support member;
   positioning the support member over the at least one groove in the substrate;
   providing a braze material, the braze material including a preform comprising a high-melting alloy, a low-melting alloy, and a binder;
   applying the preform over the support member, the braze material and the support member forming a first braze assembly; and
   heating the first braze assembly to braze the first braze assembly to the substrate;
   wherein heating the first braze assembly sinters the preform and brazes the first braze assembly to the substrate.

2. The brazing method of claim 1, comprising maintaining the braze material above the at least one groove without the braze material entering the groove and forming a convex border.

3. The brazing method of claim 1, further comprising the steps of:
   providing a second substrate; and
   positioning the second substrate over the first braze assembly so that the first braze assembly is intermediate the substrate having the at least one groove and the second substrate;
   wherein the heating step brazes the second substrate to the substrate having the at least one groove.

4. The brazing method of claim 1, wherein each of the at least one grooves forms a cooling microchannel with unimpeded flow between the substrate and the braze assembly.

5. The brazing method of claim 1, wherein the braze material comprises a nickel-based braze alloy.

6. The brazing method of claim 1, wherein the braze material includes a coefficient of thermal expansion compatible with the coefficient of thermal expansion of the substrate.

7. The brazing method of claim 1, wherein the support member is a wire.

8. The brazing method of claim 1, wherein the support member is a mesh.

9. The brazing method of claim 1, wherein the brazing comprises vacuum brazing.

10. The brazing method of claim 1, wherein the brazing comprises atmospheric brazing.

11. The brazing method of claim 1, wherein the substrate comprises a nickel-based alloy.

12. The brazing method of claim 1, wherein the substrate comprises a cobalt-based alloy.

\* \* \* \* \*